United States Patent
Xu et al.

(10) Patent No.: US 12,463,639 B2
(45) Date of Patent: Nov. 4, 2025

(54) SOLID-STATE CIRCUIT BREAKER AND POWER SOURCE LINE INCLUDING THE SOLID-STATE CIRCUIT BREAKER

(71) Applicant: Schneider Electric (China) Co., Ltd., Beijing (CN)

(72) Inventors: Jungang Xu, Shanghai (CN); Heng Bai, Shanghai (CN); Jiamin Chen, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 68 days.

(21) Appl. No.: 18/529,660

(22) Filed: Dec. 5, 2023

(65) Prior Publication Data

US 2025/0150075 A1   May 8, 2025

(30) Foreign Application Priority Data

Nov. 7, 2023 (CN) .......................... 202323004429.1

(51) Int. Cl.
*H03K 17/687*   (2006.01)

(52) U.S. Cl.
CPC ....... *H03K 17/6871* (2013.01); *H03K 17/687* (2013.01)

(58) Field of Classification Search
CPC .. H03K 17/6871; H03K 17/687; H03K 17/56; H03K 17/74; H02H 3/02; H02H 3/021; H02H 3/08; H02H 3/083; H02H 3/105; H02H 3/10; H02H 3/20; H02H 3/50; H02H 9/00; H02H 9/005; H02H 9/02; H02H 9/04; H02H 9/041; H02H 9/046; H02H 9/045; H02H 9/047

See application file for complete search history.

(56) References Cited

U.S. PATENT DOCUMENTS

| | | | |
|---|---|---|---|
| 5,440,441 A | 8/1995 | Ahuja | |
| 2005/0286184 A1* | 12/2005 | Campolo | H01R 25/003 361/42 |

* cited by examiner

*Primary Examiner* — Jung Kim
(74) *Attorney, Agent, or Firm* — Troutman Pepper Locke LLP

(57) ABSTRACT

A solid-state circuit breaker is disclosed. The solid-state circuit breaker includes: an electronic switch module, wherein an input of the electronic switch module is connected to a phase of a power source and an output of the electronic switch module is connected to a phase of a load; and an energy-absorbing apparatus which includes: a first diode branch including two diodes whose anodes are connected forming a first diode branch midpoint; a second diode branch including two diodes whose cathodes are connected to each other forming the second diode branch midpoint; a transient diode unit connected between the first diode branch midpoint and the second diode branch midpoint; wherein the first diode branch and the second diode branch are connected between two phase lines or between a phase line and a neutral line. A power source line including the solid-state circuit breaker is also disclosed.

10 Claims, 5 Drawing Sheets

SOLID-STATE CIRCUIT BREAKER AND POWER SOURCE LINE INCLUDING THE SOLID-STATE CIRCUIT BREAKER

TECHNICAL FIELD

The present disclosure relates to a solid-state circuit breaker and a power source line including the solid-state circuit breaker.

BACKGROUND

Solid-state circuit breakers employ electronic switches, such as thyristors, transistors, MOSFETs, IGBTs, and are connected between a power source and a load. In the case of constant dynamic switching of the load, and in the case of an overload or short circuit in the load or the line causing the electronic switch to turn off, the rate of change of the current in the line can be large, so that the induced electromotive force caused by the inductance of the load or the supply line can lead to overvoltage and overcurrent phenomena across the electronic switch, which in severe cases can lead to a breakdown of the electronic switch.

SUMMARY

The present disclosure provides a solid-state circuit breaker capable of absorbing or consuming electric power when overvoltage and overcurrent occur to protect electronic switches from damage.

The present disclosure provides a solid-state circuit breaker which includes: an electronic switch module, wherein an input of the electronic switch module is configured to be connected to a phase of a power source and an output of the electronic switch module is configured to be connected to a phase of a load; and an energy-absorbing apparatus which includes: a first diode branch including two diodes whose anodes are connected to each other forming a first diode branch midpoint; a second diode branch including two diodes whose cathodes are connected to each other forming the second diode branch midpoint; a transient diode unit connected between the first diode branch midpoint and the second diode branch midpoint; wherein the first diode branch and the second diode branch are connected between two phase lines or between a phase line and a neutral line.

In an embodiment according to the present disclosure, the solid-state circuit breaker includes: Three of the electronic switch modules, wherein the inputs of the three electronic switch modules are respectively configured to be connected to one phase of an AC power source, and the outputs of the three electronic switch modules are respectively configured to be connected to one phase of the load; wherein the energy-absorbing apparatus includes: three of the first diode branches, wherein the first diode branches are respectively connected between respective two phases of three phase lines, and three of the first diode branch midpoints are connected to each other; three of the second diode branches, wherein the second diode branches are respectively connected between respective two phases of the three phase lines, and three of the first diode branch midpoints are connected to each other.

In an embodiment according to the disclosure, the energy-absorbing apparatus is arranged at the input or the output of the electronic switch module.

In an embodiment according to the disclosure, the power source is a single-phase AC power source, a three-phase AC power source or a DC power source.

In an embodiment according to the disclosure, the diode is designed as a fast recovery diode.

In an embodiment according to the disclosure, the transient diode unit is designed as a bidirectional transient diode or as two unidirectional transient diodes in anti-series.

In an embodiment according to the disclosure, the transient diode unit includes a plurality of transient diodes connected in series and in parallel.

In an embodiment according to the disclosure, the electronic switch module includes a first MOSFET and a second MOSFET, and sources of the first MOSFET and the second MOSFET are connected to each other, wherein a drain of the first MOSFET is connected with the input of the electronic switch module and a drain of the second MOSFET is connected with the output of the electronic switch module.

In an embodiment according to the disclosure, the electronic switch module includes a first MOSFET and a second MOSFET, and drains of the first MOSFET and the second MOSFET are connected to each other, wherein a source of the first MOSFET is connected with the input of the electronic switch module and a source of the second MOSFET is connected with the output of the electronic switch module.

The disclosure also provides a power source line including a solid-state circuit breaker as previously described.

In an embodiment according to the disclosure, the power source line further includes an isolation switch, the isolation switch is connected in series with the electronic switch module.

BRIEF DESCRIPTION OF DRAWINGS

In order to explain the technical scheme of the embodiment of the present disclosure more clearly, the accompanying drawings needed in the description of the embodiment will be briefly introduced below. The accompanying drawings in the following description are only exemplary embodiments of the present disclosure.

DETAILED DESCRIPTION

Figure 1:
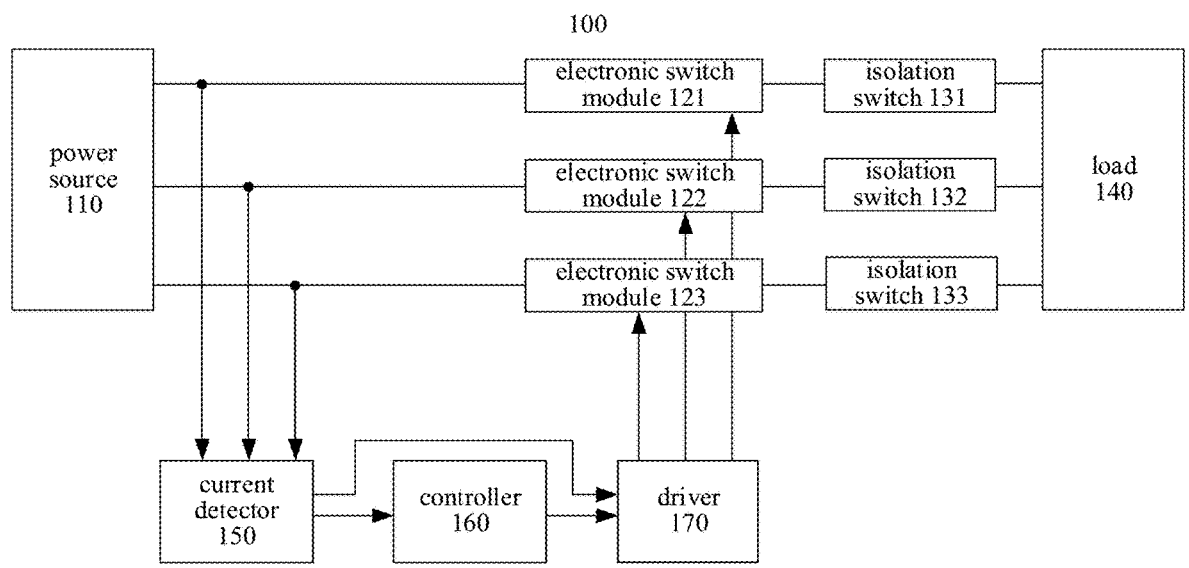
FIG. 1 illustrates a schematic block diagram of a solid-state circuit breaker.

To make the objects, technical schemes and advantages of the present disclosure more obvious, exemplary embodiments according to the present disclosure will be described in detail below regarding the accompanying drawings. Obviously, the described embodiments are only a part of the embodiments of the present disclosure, not all the embodiments of the present disclosure. It should be understood that the present disclosure is not limited by the exemplary embodiments described herein.

In this specification and the accompanying drawings, basically the same or similar steps and elements are denoted by the same or similar reference numerals, and repeated descriptions of these steps and elements will be omitted. Meanwhile, in the description of the present disclosure, the terms "first", "second" and so on are only used to distinguish descriptions, and cannot be understood as indicating or implying relative importance or order.

In the present specification and drawings, elements are described in singular or plural form according to an embodiment. However, the singular and plural forms are appropriately selected for the proposed cases merely for convenience of explanation and are not intended to limit the present disclosure thereto. Thus, a singular form can include a plural form, and a plural form can include a singular form as well, unless the context clearly indicates otherwise. In the embodiments of the present disclosure, unless explicitly stated otherwise, "connected" does not mean necessarily "directly connected" or "directly contacted", but only needs to be electrically connected.

FIG. 1 illustrates a schematic block diagram of a solid-state circuit breaker 100. The solid-state circuit breaker 100 includes three electronic switch modules 121, 122, and 123. These electronic switch modules are constituted by power semiconductor switches, such as MOSFET (Metal-Oxide Semiconductor Field Effect Transistor), IGBT (Insulated Gate Bipolar Transistor), GTO (Gate Turn-Off Thyristor), IGCT (Integrated Gate Commutated Thyristor). For example, each electronic switch module 121, 122 and 123 can include a first MOSFET and a second MOSFET, respectively. The sources of the first and second MOSFET are connected to each other. The drain of the first MOSFET is connected with an input of the electronic switch module, and the drain of the second MOSFET is connected with an output of the electronic switch module. Alternatively, the drains of the first MOSFET and the second MOSFET are connected to each other and the source of the first MOSFET is connected to the input of the electronic switch module and the source of the second MOSFET is connected to the output of the electronic switch module. Isolation switches 131, 132, and 133 are also shown in FIG. 1. The Isolation switches 131, 132, and 133 are connected in series with the solid-state circuit breaker 100, or in other words connected in series with the electronic switch modules 121, 122, and 123, respectively. The isolation switches 131, 132 and 133 can for example be mechanical switches.

The input of each electronic switch module 121, 122 and 123 is configured to be connected to a phase of the (alternating current, AC) power source 110, respectively, and the output of each electronic switch module 121, 122 and 123 is configured to be connected to a phase of the stator winding 130 of the electric motor, respectively.

The solid-state circuit breaker 100 shown in FIG. 1 is an application in a three-phase power source line. The application of the solid-state circuit breaker 100 to a phase and neutral line, as well as the application of the solid-state circuit breaker 100 to a DC power source line, can be readily appreciated by those skilled in the art.

The solid-state circuit breaker 100 can be turned off to protect the load and line in the case of a change in the load, an overload or short circuit to the load or line. To implement the protection function, the current detector 150 detects the current of one phase or each of the phases, and when an excess current is detected, the current detector 150 sends a drive signal directly to the driver 170 to turn off one or all of the electronic switch modules 121, 122, and 123. This process is referred to as hardware shutdown. In addition, the current detector 150 can also feed the detected current signal to the controller 160, which can further judge whether the occurring overcurrent is large enough, e.g. can compare the detected current signal with a pre-given threshold value. In the case that the overcurrent is very large and would cause damage to the load, the lines, and the electronic switches, the controller 160 sends a drive signal to the driver 170, which performs a secondary shutdown of one or all of the electronic switch modules 121, 122, and 123. This process is referred to as software shutdown. In the case that the overcurrent is small, e.g. where the overcurrent is caused by dynamic switching of the load, or in the case that the overcurrent disappears, the controller 160 can send a drive signal to the driver 170 to cause one or all of the electronic switch modules 121, 122, and 123 to turn on. In addition, the controller 160 can also control on-off of the isolation switches 131, 132, and 133. For electronic switch modules 121, 122 and 123 consisting of semiconductor switches, turning off in the order of microseconds is not too difficult. However, if only the electronic switch modules 121, 122 and 123 are turned off without providing an energy absorption circuit, the inductive energy of the load or line will cause a significant induced electromotive force, which will charge the junction capacitance of the electronic switch modules 121, 122 and 123, and thereby can knock out the electronic switch modules 121, 122 and 123.

Figure 2:
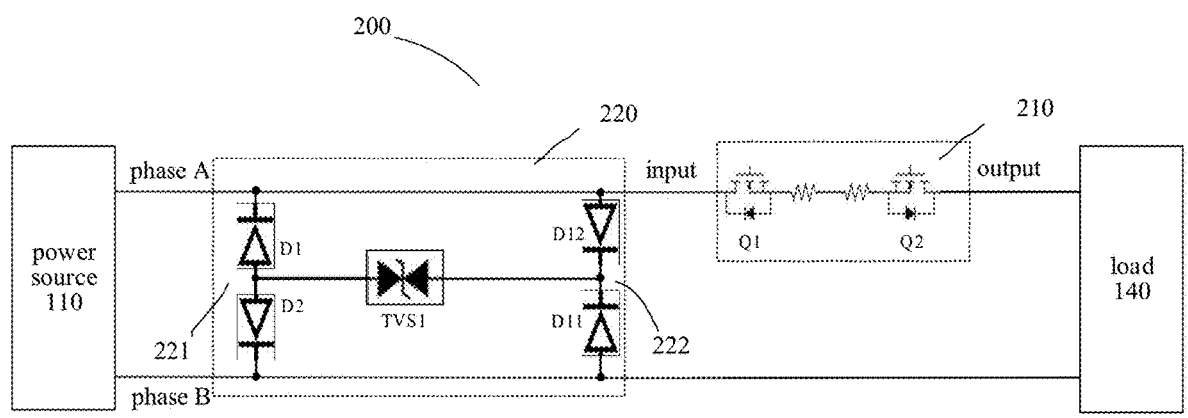
FIG. 2 illustrates a schematic diagram of a circuit structure of a solid-state circuit breaker with an energy absorption circuit according to an embodiment of the present disclosure.

FIG. 2 illustrates a schematic diagram of a circuit structure of a solid-state circuit breaker with an energy absorption circuit according to an embodiment of the present disclosure. In an embodiment according to the present disclosure, the solid-state circuit breaker 200 includes an electronic switch module 210. The input of the electronic switch module 210 is configured to connect to a phase of the power source 110, and the output of the electronic switch module 210 is configured to connect to a phase of the load 140. The electronic switch module 210 is exemplarily illustrated by two series-connected MOSFETs Q1 and Q2. In an embodiment according to the present disclosure, the sources of the first and second MOSFETs Q1 and Q2 can be connected to each other, e.g., wherein the drain of the first MOSFET Q1 is connected to the input of the electronic switch module 210 and the drain of the second MOSFET Q1 is connected to the output of the electronic switch module 210. In an embodiment according to the present disclosure, the drains of the first and second MOSFET Q1 and Q2 can be connected to each other, e.g., wherein the source of the first MOSFET Q1 is connected to the input of the electronic switch module 210 and the source of the second MOSFET Q2 is connected to the output of the electronic switch module 210.

In an embodiment of the present disclosure, the solid-state circuit breaker 200 further includes an energy-absorbing apparatus 220. The energy-absorbing apparatus 220 includes a first diode branch 211 including two diodes D1 and D2. The anodes of the two diodes D1 and D2 are connected to each other to form a first diode branch midpoint. The energy-absorbing apparatus 220 further includes a second diode branch 222 including two diodes D11 and D12. The cathodes of the two diodes D11 and D12 are connected to each other to form a second diode branch midpoint. In an embodiment according to the present disclosure, the diode can be, e.g., a fast recovery diode. The energy-absorbing apparatus 220 also includes a transient diode unit TVS1. The transient diode unit TVS1 is connected between the midpoint of the first diode branch 221 and the midpoint of the second diode branch 222. The transient diode unit TVS1 in FIG. 2 only exemplarily includes one transient diode, and the transient diode is a bidirectional transient diode. In an embodiment according to the disclosure, the transient diode unit can for example be designed as a bidirectional transient diode or as two unidirectional transient diodes in anti-series. Furthermore, in embodiments according to the present disclosure, the transient diode unit TVS1 can for example also include a plurality of series and/or parallel connected transient diodes, which can for example form a transient diode array. In the case that the power source 110 is an AC power source, the arrangement of the energy-absorbing apparatus 220 shown in FIG. 2 can be understood as being arranged between phase line and neutral line or between phase lines. In the case that the power source 110 is a DC (direct current) power source, the arrangement of the energy-absorbing apparatus 220 shown in FIG. 2 can be understood as being arranged between two direct current supply lines, which can also be understood as being two phase lines. Inside the energy-absorbing apparatus 220, a first diode branch 221 and a second diode branch 222 are connected between two phase lines or between a phase line and a neutral line.

In the case of constant dynamic switching of the load, and in the case of an overload or a short circuit in the load or the line causing the electronic switch to turn off, over-voltage and over-current can occur in the phase line or the supply line. When the voltage between phase A and phase B is greater than the conduction threshold of the transient diode unit TVS1 (either the conduction threshold of the bidirectional transient diode or the reverse conduction threshold of one of the unidirectional transient diodes), the transient diode unit TVS1 conducts. Thus, a loop can be formed inside the energy-absorbing apparatus 220, for example a current can flow from phase A through diode D12, transient diode unit TVS1, diode D2 to phase B, or a current can flow from phase B through diode D11, transient diode unit TVS1, diode D1 to phase A. The transient diode unit TVS1 is thus capable of energy consumption or energy absorption. After a short time of energy absorption, the voltage on phase A or phase B drops back to the normal range.

In the embodiment according to the present disclosure, in the case that an overcurrent is detected by the current detector 150, if the controller 160 determines that the overcurrent is caused by dynamic switching of the load, the controller 160 controls the electronic switch module to remain turned on and the transient diode unit in the energy-absorbing apparatus absorbs energy until the voltage on the line is restored to the normal range; If the controller 160 determines that the overcurrent is caused by an overload or short circuit, the controller 160 controls the electronic switch module to turn off and the corresponding load to power off, and the transient diode unit in the energy-absorbing apparatus absorbs energy until the voltage on the line is restored to the normal range.

In FIG. 2, an energy-absorbing apparatus 220 is exemplarily arranged at the input of the electronic switch module 210 and configured to absorb energy when an overvoltage occurs at the input side of the electronic switch module. In an embodiment according to the present disclosure, the energy-absorbing apparatus 220 can also be arranged at the output of the electronic switch module 210, and preferably the energy-absorbing apparatus 220 is arranged both at the input and at the output of the electronic switch module 210, which is shown in later figures.

Figure 3:
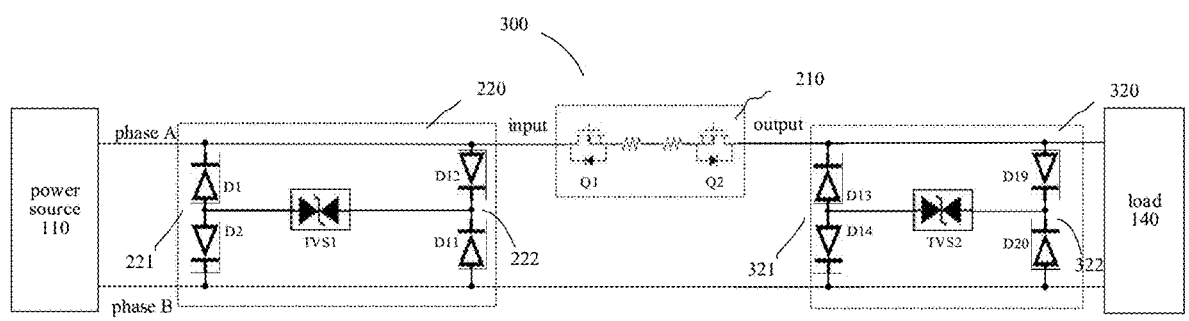
FIG. 3 illustrates a schematic diagram of a circuit structure of a solid-state circuit breaker with an energy absorption circuit according to another embodiment of the present disclosure.

FIG. 3 illustrates a schematic diagram of a circuit structure of a solid-state circuit breaker 300 with an energy absorption circuit according to another embodiment of the present disclosure. The solid-state circuit breaker 300 shown in FIG. 3 differs from the solid-state circuit breaker 200 shown in FIG. 2 by a further energy-absorbing apparatus 320 is additionally arranged at the output of the electronic switch module 210. The energy-absorbing apparatus 320 includes a first diode branch 311 including two diodes D13 and D14. The anodes of the two diodes D13 and D14 are connected to each other to form a first diode branch midpoint. The energy-absorbing apparatus 320 also includes a second diode branch 322 that includes two diodes D19 and D20. The cathodes of the two diodes D19 and D20 are connected to each other to form a second diode branch midpoint. The energy-absorbing apparatus 220 also includes a transient diode unit TVS2. The transient diode unit TVS2 is connected between the midpoint of the first diode branch 321 and the midpoint of the second diode branch 322. In the event of an overvoltage occurring at the output side of the electronic switch module, the transient diode unit TVS2 in the energy absorption apparatus 320 conducts and performs energy consumption or energy absorption. After a short time of energy absorption, the voltage on phase A or phase B drops back to the normal range and the transient diode unit TVS2 turns off.

Figure 4:
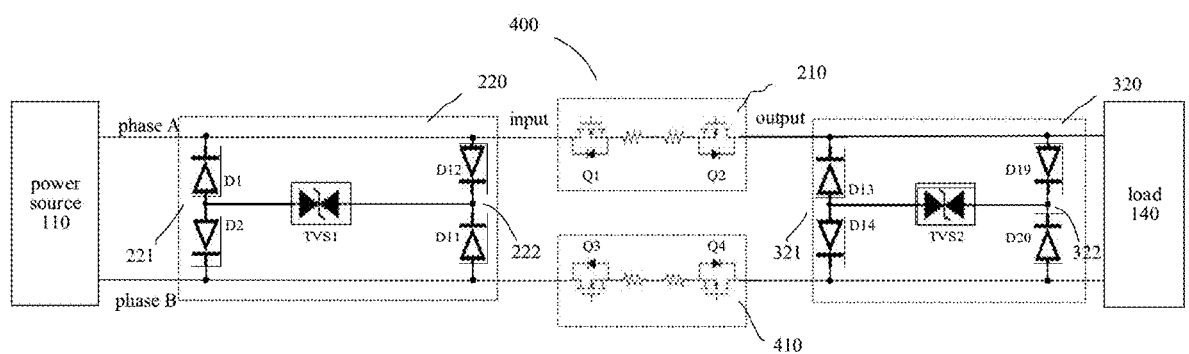
FIG. 4 illustrates a schematic diagram of a circuit structure of a solid-state circuit breaker with an energy absorption circuit according to another embodiment of the present disclosure.

FIG. 4 illustrates a schematic diagram of a circuit structure of a solid-state circuit breaker 400 with an energy absorption circuit according to another embodiment of the present disclosure. The solid-state circuit breaker 400 shown in FIG. 4 differs from the solid-state circuit breaker 300 shown in FIG. 3 by the addition of an additional electronic switch module 410 over phase B. Arranging an electronic switch module separately on each phase line results in better protection of the load.

Figure 5:
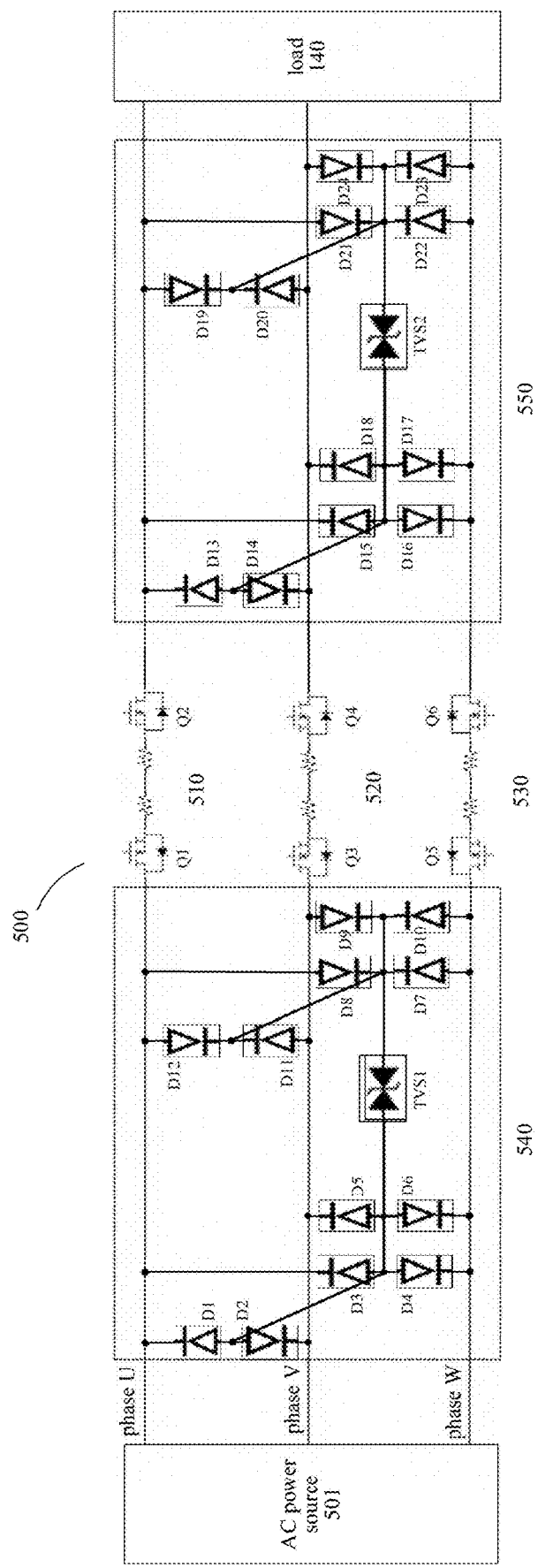
FIG. 5 illustrates a schematic diagram of a circuit structure of a solid-state circuit breaker with an energy absorption circuit according to another embodiment of the present disclosure.

FIG. 5 illustrates a schematic diagram of a circuit structure of a solid-state circuit breaker 500 with an energy absorption circuit according to another embodiment of the present disclosure. In this embodiment, the solid-state circuit breaker 500 is arranged in a three-phase supply line. The AC power source 501 provides three-phase AC power. The solid-state circuit breaker 500 includes three electronic switch modules 510, 520 and 530. They are arranged on U, V, W phases, respectively, wherein the inputs of the three electronic switch modules 510, 520 and 530 are configured to be connected to the U, V, W of the AC power source 501, respectively, and the outputs of the three electronic switch modules 510, 520 and 530 are configured to be connected to the U, V, W of the load 140, respectively.

In this embodiment, the solid-state circuit breaker 500 also includes an energy absorption circuit 540 and an energy absorption circuit 550. The energy absorption circuit 540 is disposed on the input side of the three electronic switch modules 510, 520, and 530 and the energy absorption circuit 550 is disposed on the output side of the three electronic switch modules 510, 520, and 530. In another embodiment according to the present disclosure, the solid-state circuit breaker 500 can include an energy absorption circuit 540 or an energy absorption circuit 550. In a three-phase circuit, the energy absorption circuit 540 in the solid-state circuit breaker 500 includes three first diode branches, i.e., a first diode branch of diodes D1 and D2, connected between the U-phase and the V-phase; a first diode branch of diodes D3 and D4, connected between the U phase and the W phase; a first diode branch of diodes D5 and D6, connected between the V-phase and the W-phase. The midpoints of the three first diode branches are connected to each other. The energy absorption circuit 540 further includes three second diode branches, i.e., a second diode branch of diodes D11 and D12, connected between the U phase and the V phase; a second diode branch of diodes D7 and D8 connected between the U phase and the W phase; a second diode branch of diodes D9 and D10, connected between the V-phase and the W-phase. The Midpoints of the three second diode branches are connected to each other. A transient diode unit TVS1 is connected between the first diode branch midpoint and the second diode branch midpoint.

By arranging the energy absorption circuit 540, the voltage between the phases can cause the transient diode unit TVS1 to conduct, which thus performs energy consumption or energy absorption, when an overvoltage occurs between any two of the three phases of U, V, W. For example, when an overvoltage occurs between the U-W phases, a current can flow from the U phase through the diodes D8 or D12, the transient diode unit TVS1, the diodes D4 or D6 to the W phase.

Energy absorption circuit 550 has the same construction as energy absorption circuit 540. The energy absorption circuit 550 includes three first diode branches, i.e., a first diode branch of diodes D13 and D14, connected between the U phase and the V phase; a first diode branch of diodes D15 and D16 connected between the U phase and the W phase; a first diode branch of diodes D17 and D18, connected between the V-phase and the W-phase. The Midpoints of the three first diode branches are connected to each other. The energy absorption circuit 550 also includes three second diode branches, i.e., a second diode branch of diodes D19 and D20, connected between the U phase and the V phase; a second diode branch of diodes D21 and D22 connected between the U phase and the W phase; a second diode branch of diodes D23 and D24, connected between the V-phase and the W-phase. The Midpoints of the three second diode branches are connected to each other. A transient diode unit TVS2 is connected between the first diode branch midpoint and the second diode branch midpoint.

The transient diode unit TVS2 in the energy absorption apparatus 550 conducts and performs energy consumption or energy absorption, when an overvoltage occurs on the output side of the electronic switch modules 510, 520 and 530.

Figure 6:
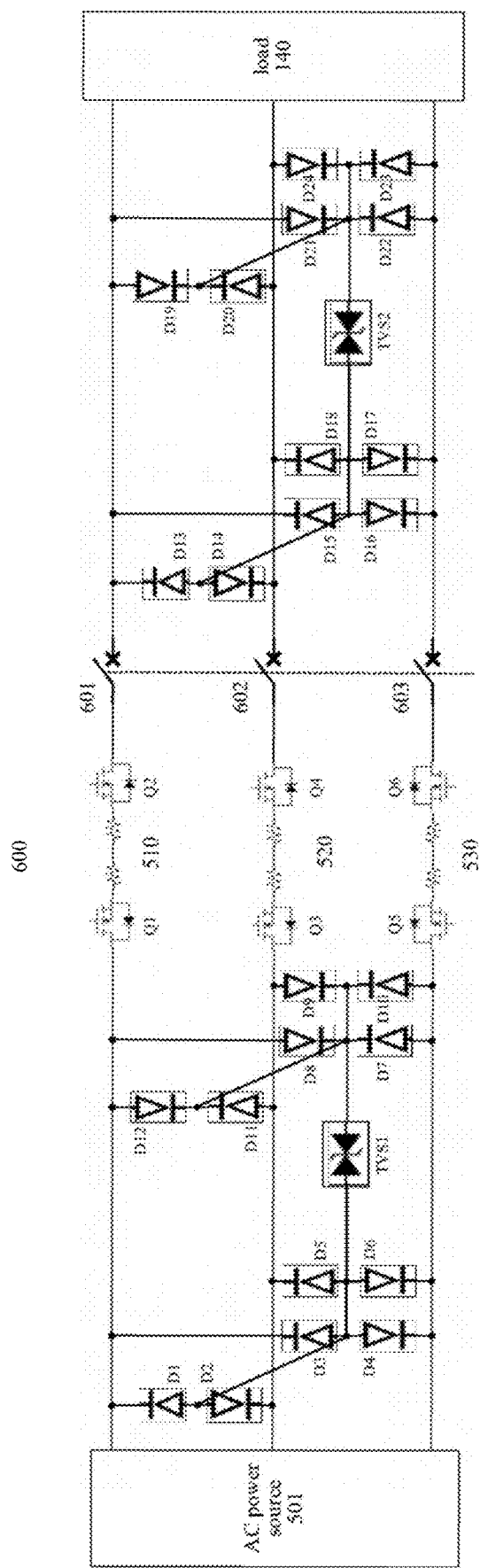
FIG. 6 illustrates a schematic diagram of a circuit structure of a power source line according to an embodiment of the present disclosure.

FIG. 6 illustrates a schematic diagram of a circuit structure of a power source line 600 according to an embodiment of the present disclosure. The power source line 600 includes a solid-state circuit breaker 500 as shown in FIG. 5. Furthermore, in an embodiment according to the present disclosure, the power source line 600 can further include, e.g., an isolation switch. Isolation switches 601, 602 and 603, which are connected in series with the electronic switch modules 510, 520 and 530, respectively, are shown in FIG. 6. The isolation switches can in particular be mechanical switches, which can for example also be controlled by the controller 160, such that after the electronic switch modules 510, 520 and 530 and the power semiconductor switches therein are turned off, the isolation switches 601, 602 and 603 are turned off, thereby ensuring that the power source lines are disconnected.

The block diagrams of circuits, units, devices, apparatus, devices, and systems referred to in the present disclosure are merely illustrative examples and are not intended to require or imply that the connections, arrangements, and configurations must be made in the manner shown in the block diagrams. As will be appreciated by those skilled in the art, these circuits, units, devices, apparatus, devices, and systems can be connected, arranged, and configured in any way as long as the desired purpose is achieved. The circuits, units, devices, and apparatus referred to in the present disclosure can be implemented in any suitable manner, e.g., in Application Specific Integrated Circuits (ASICs), Field Programmable Gate Arrays (FPGAs), etc., or can be implemented in a general-purpose processor in conjunction with a program.

It should be understood by those skilled in the art that the above-described specific embodiments are merely examples and not limitations, and that various modifications, combinations, partial combinations and substitutions can be made to the embodiments of the present disclosure depending on design requirements and other factors, provided that they are within the scope of the appended claims or the equivalents thereof, i.e., within the scope of the claims to be protected by the present disclosure.

What is claimed is:

1. A solid-state circuit breaker, comprising:
   three electronic switch modules, wherein an input of one of the three electronic switch modules is configured to be connected to a phase of an AC power source, respectively, and an output of one of the three electronic switch modules is configured to be connected to a phase of a load, respectively; and
   an energy-absorbing apparatus comprising:
      three first diode branches, wherein each of the three first diode branches comprises two diodes whose anodes are connected to each other forming a first diode branch midpoint, each of the three first diode branches are respectively connected between respective two phases of three phase lines, and three of the first diode branch midpoints are connected to each other;
      three second diode branches, wherein each of the three second diode branches comprises two diodes whose cathodes are connected to each other forming the second diode branch midpoint, each of the three second diode branches are respectively connected between respective two phases of the three phase lines, and three of the second diode branch midpoints are connected to each other;
      a transient diode unit connected between the first diode branch midpoint and the second diode branch midpoint.

2. The solid-state circuit breaker according to claim 1, wherein the energy-absorbing apparatus is arranged at the input or the output of the electronic switch module.

3. The solid-state circuit breaker according to claim 1, wherein the power source is a single phase AC power source, a three phase AC power source or a DC power source.

4. The solid-state circuit breaker according to claim 1, wherein the diodes of the first and second diode branches are each designed as a fast recovery diode.

5. The solid-state circuit breaker according to claim 1, wherein the transient diode unit is designed as a bidirectional transient diode or as two unidirectional transient diodes in anti-series.

6. The solid-state circuit breaker according to claim 1, wherein the transient diode unit comprises a plurality of transient diodes connected in series and in parallel.

7. The solid-state circuit breaker according to claim 1,
   wherein the electronic switch module comprises a first MOSFET and a second MOSFET, and sources of the first MOSFET and the second MOSFET are connected to each other,
   wherein a drain of the first MOSFET is connected with the input of the electronic switch module and a drain of the second MOSFET is connected with the output of the electronic switch module.

8. The solid-state circuit breaker according to claim 1, wherein
the electronic switch module comprises a first MOSFET and a second MOSFET, and drains of the first MOSFET and the second MOSFET are connected to each other,
wherein a source of the first MOSFET is connected with the input of the electronic switch module and a source of the second MOSFET is connected with the output of the electronic switch module.

9. A power source line, comprising a solid-state circuit breaker according to claim 1.

10. The power source line according to claim 9, further comprising an isolation switch, the isolation switch is connected in series with the electronic switch module.

* * * * *